United States Patent
Karuppan et al.

(10) Patent No.: US 12,277,571 B2
(45) Date of Patent: Apr. 15, 2025

(54) SYSTEM AND METHOD INCLUDING A DISTRIBUTED LEDGER DATA STRUCTURE FOR AUTHENTICATING AND CLEARING COUPONS

(71) Applicant: SigmaLedger, Inc., Jersey City, NJ (US)

(72) Inventors: Kishore Karuppan, Hamilton, OH (US); Michael T. Loyson, Fort Thomas, KY (US); Curtis Jackson, Cincinnati, OH (US)

(73) Assignee: SigmaLedger, Inc., Jersey City, NJ (US)

( * ) Notice: Subject to any disclaimer, the term of this patent is extended or adjusted under 35 U.S.C. 154(b) by 0 days.

(21) Appl. No.: 16/436,963

(22) Filed: Jun. 11, 2019

(65) Prior Publication Data
US 2020/0302468 A1    Sep. 24, 2020

Related U.S. Application Data

(60) Provisional application No. 62/822,074, filed on Mar. 22, 2019.

(51) Int. Cl.
*G06Q 30/0207*    (2023.01)
*H04L 9/06*    (2006.01)
(Continued)

(52) U.S. Cl.
CPC ....... *G06Q 30/0222* (2013.01); *H04L 9/0637* (2013.01); *H04L 9/0643* (2013.01); *H04L 9/3247* (2013.01); *H04L 9/50* (2022.05)

(58) Field of Classification Search
CPC . G06Q 30/0222; H04L 9/0637; H04L 9/0643; H04L 9/3247; H04L 9/50; H04L 2209/56; H04L 9/3239; H04L 63/12
See application file for complete search history.

(56) References Cited

U.S. PATENT DOCUMENTS 4,949,256 A * 8/1990 Humble ............... G07G 1/0036
                                                         705/16
6,328,339 B2   12/2001 Dixon, III
(Continued)

FOREIGN PATENT DOCUMENTS

CA         2364734 A1     6/2003
CA         3061638 A1 * 11/2018    ............. G06F 21/00
(Continued)

OTHER PUBLICATIONS

R. M. Amir Latif, S. Iqbal, O. Rizwan, S. U. A. Shah, M. Farhan and F. Ijaz, "Blockchain Transforms the Retail Level by Using a Supply chain Rules and Regulation," 2019 2nd International Conference on Communication, Computing and Digital systems (C-CODE), 2019, pp. 264-269 (Year: 2019).*

(Continued)

*Primary Examiner* — Michael W Schmucker
*Assistant Examiner* — Scott Snider
(74) *Attorney, Agent, or Firm* — Mendelsohn Dunleavy, P.C.; Steve Mendelsohn

(57) ABSTRACT

System of authenticating and clearing coupons including a central platform accessible by retailer computer system(s) and manufacturer computer system(s), where the central platform contains coupon authentication table(s) updated by the manufacturer computer system(s) and accessible by the retailer computer system(s), and the central platform contains coupon transaction ledger(s) updated by the retailer computer system(s) and accessible by the manufacturer computer system(s); and a blockchain transactions ledger including blockchain nodes memorializing modifications made to the coupon authentication table(s) and the coupon transaction ledger(s) in the central platform.

29 Claims, 4 Drawing Sheets

(51) Int. Cl.
*H04L 9/32* (2006.01)
*H04L 9/00* (2022.01)

(56) References Cited

U.S. PATENT DOCUMENTS

| | | | |
|---|---|---|---|
| 6,697,785 | B2 | 2/2004 | Dixon, III |
| 6,932,270 | B1 | 8/2005 | Fajkowski |
| 8,533,045 | B1* | 9/2013 | Cunningham ..... G06Q 30/0207 |
| | | | 705/14.47 |
| 9,070,133 | B2 | 6/2015 | Thibedeau |
| 9,098,855 | B2 | 8/2015 | Thibedeau |
| 11,900,339 | B1* | 2/2024 | Vijayaraghavan .... H04L 67/104 |
| 2007/0156513 | A1 | 7/2007 | Mastrianni |
| 2011/0197072 | A1 | 8/2011 | Shen |
| 2012/0284107 | A1 | 11/2012 | Gernaat |
| 2013/0085829 | A1 | 4/2013 | Kavis |
| 2016/0098723 | A1 | 4/2016 | Feeney |
| 2016/0098730 | A1 | 4/2016 | Feeney |
| 2017/0048209 | A1 | 2/2017 | Lohe et al. |
| 2017/0185981 | A1 | 6/2017 | Emmerson |
| 2017/0206523 | A1 | 7/2017 | Goeringer et al. |
| 2017/0236143 | A1* | 8/2017 | Code ................... G06Q 20/387 |
| | | | 705/14.27 |
| 2017/0249622 | A1 | 8/2017 | Oritz et al. |
| 2017/0331896 | A1 | 11/2017 | Holloway et al. |
| 2017/0352116 | A1 | 12/2017 | Pierce et al. |
| 2017/0364936 | A1* | 12/2017 | Balfour ............ G06Q 20/38215 |
| 2018/0089041 | A1 | 3/2018 | Smith et al. |
| 2018/0096163 | A1 | 4/2018 | Jacques de Kadt et al. |
| 2018/0150865 | A1* | 5/2018 | Arora ................ G06Q 20/3678 |
| 2019/0012695 | A1* | 1/2019 | Bishnoi ................ G06Q 20/322 |
| 2019/0073666 | A1* | 3/2019 | Ortiz .................. G06Q 30/0207 |
| 2019/0130484 | A1 | 5/2019 | de Jong |
| 2019/0197532 | A1 | 6/2019 | Jayachandran et al. |
| 2019/0266178 | A1 | 8/2019 | Madhavan et al. |
| 2019/0268165 | A1 | 8/2019 | Monica et al. |
| 2019/0340623 | A1 | 11/2019 | Rivkind et al. |
| 2020/0117690 | A1 | 4/2020 | Tran et al. |
| 2020/0265458 | A1* | 8/2020 | Esecson ............. G06Q 30/0238 |
| 2020/0311698 | A1 | 10/2020 | Gardner et al. |
| 2020/0320529 | A1 | 10/2020 | Lyadvinsky |
| 2020/0328894 | A1 | 10/2020 | Baker |

FOREIGN PATENT DOCUMENTS

| | | | |
|---|---|---|---|
| EP | 3531362 A1 * | 8/2019 | .......... G06Q 20/321 |
| RU | 2679545 C | 2/2019 | |

OTHER PUBLICATIONS

D. D. F. Maesa, P. Mori and L. Ricci, "Blockchain based access control", IFIP International Conference on Distributed Applications and Interoperable Systems, pp. 206-220, Jun. 2017 (Year: 2017).*

K. Fuchs, D. Vuckovac and A. Ilic, "Towards interoperability in mobile coupons: Enabling cross retailer coupon validation," 2017 International Conference on Information and Communication Technology Convergence (ICTC), Jeju, Korea (South), 2017, pp. 327-333, doi: 10.1109/ICTC.2017.8190997. (Year: 2017).*

Sigmaledger, "Sigmaledger helps combat products counterfeiting and illegal re-import", SigmaLedger YouTube Channel, Jan. 10, 2017, www.youtube.com/watch?v=s4IXSJsxWOk.

SigmaLedger, "SigmaLedger: how to register your business account", SigmaLedger YouTube Channel, Dec. 13, 2017, www.youtube.com/watch?v=WBQmOYbIn3s.

SigmaLedger, "SigmaLedger: protect your products and verify authenticity with SigmaLedger IDs", SigmaLedger YouTube Channel, Jan. 30, 2018, www.youtube.com/watch?v=7VzcvDyUSvg.

SigmaLedger, "SigmaLedger: register your product and create SigmaLedger IDs", SigmaLedger YouTube Channel, Jan. 11, 2018, www.youtube.com/watch?v=i5SkzLCx2nQ.

SigmaLedger Team, "How Blockchain Can Help Fighting Counterfeit", SigmaLedger Blog, Sep. 4, 2017, blog.sigmaledger.com/how-blockchain-can-help-fighting-counterfeit-c3a08e643c7a.

* cited by examiner

SYSTEM AND METHOD INCLUDING A DISTRIBUTED LEDGER DATA STRUCTURE FOR AUTHENTICATING AND CLEARING COUPONS

BACKGROUND

FIG. 1 provides a block diagram representation of a prior art system for coupon redemption authentication and payment. As shown in FIG. 1, manufacturers 10 will issue coupons 12 that are used by consumers 14 while shopping at a store 16. The store 16 will redeem the coupons 12 in exchange for discounts 18 provided to the consumer. A current problem with printed coupons is that there is an ability to create counterfeit printed coupons 20 that the consumer redeems at the store 16 and receives unauthorized discounts 18 for the purchases made at the store. In the prior art coupon authentication, redemption and payment system, the retailer 16 utilizes a third-party retailer clearing house 22 to receive the redeemed coupons 24 from the store 16 on a weekly basis. The retailer clearing house 22 scans all the coupons again and will prepare an invoice by manufacturer 10 and send to the manufacturer agent 28. Manufacturer agent 28, then invoices the manufacturer 10 and makes the payment to retailer clearing house 22 or store 16 of the amount of discount provided to consumers 14 along with coupon handling fee. Furthermore, much of the retailer clearing house's operations are manual and time intensive.

The retailer's clearing house 22 will then coordinate with an agent of the manufacturer 28 to receive the "valid coupon data". The retailer clearing house 22 will scan the received coupons and authenticate the redeemed coupons based upon coupon validation data. For valid coupons, the invoice is sent to manufacturer agent 28. For invalid/counterfeit coupons, the retailer clearinghouse 22 mails the coupons to manufacturer agent 28 and is further analyzed by manufacturer agent 28 and the details are added as a separate line item in invoice for manufacturer 10. Manufacturer approves the invoice and payment is made to manufacturer agent 28 and then the manufacturer agent 28 reimburses the retailer's clearing house money 32 to compensate for the validated and redeemed coupons. The manufacturer's agent 28 will provide back to the manufacturer a report 34 of the redeemed coupon transactions for that particular time period.

There are various problems and issues with this prior art coupon redemption authentication and payment systems, such as the one shown in FIG. 1. Currently, there is no or little coupon validation being performed at the retailer's point of sale ("POS"). Furthermore, the authentication of the printed coupons typically requires manual processes and are highly resource and process intensive. Consequently, because the coupon authentication (especially with respect to printed coupons) is manually intensive, it is also prone to human error. Payments in this prior art system may take-more than four weeks to occur. This is due to the fact that the physical printed coupons are aggregated and shipped to the clearing houses and are then scanned again to reconcile and invoice the manufacturers. This system also requires coupon handling and overhead to cover the collection, transportation and disposal of the printed coupons and the various copies of the printed coupons. For example, some retailers are paid several cents a coupon by the manufacturers as handling fees. This costs manufacturers millions of dollars per year.

SUMMARY

The current disclosure provides an undisputable coupon processing system, and associated methods, that gives full transparency to coupon redemptions enabling faster payments while eliminating fraud. The system and associated methods utilize a distributed ledger data structure (which may be in the form of a blockchain data structure) for authenticating and clearing printed and digital/electronically created coupons.

In a first aspect according to the current disclosure a system of authenticating and clearing coupons is provided. Such system may include: (a) a central platform accessible by retailer computer system(s) and manufacturer computer system(s), where the central platform contains coupon authentication table(s) updated by the manufacturer computer system(s) and accessible by the retailer computer system(s), and the central platform contains coupon transaction ledger(s) updated by the retailer computer system(s) and accessible by the manufacturer computer system(s); and (b) a blockchain transactions ledger including blockchain nodes memorializing modifications made to the coupon authentication table(s) and the coupon transaction ledger(s) in the central platform.

In a detailed embodiment, the central platform contains a plurality of coupon transaction ledgers, where each coupon transaction ledger is owned by a respective manufacturer. Alternatively, or in addition, the central platform contains a plurality of coupon authentication tables, where each coupon authentication table is owned by a respective retailer. Alternatively, or in addition, the central platform includes smart contract(s) triggering coupon redemption payments from the manufacturer(s) to the retailer(s) based upon changes made to the coupon transaction ledger. Alternatively, or in addition, the central platform includes smart contract(s) controlling ownership of the coupon transaction ledger(s) by the manufacturer(s) and controlling ownership of the coupon authentication table(s) by the retailer(s). Alternatively, or in addition, the system further includes hashing algorithms for use in authenticating access to the coupon transaction ledger by retailers. Alternatively, or in addition, the system further includes hashing algorithms for use in authenticating access to the coupon authentication tables by manufacturers.

In a second aspect, a method for authenticating coupons includes the steps of: (1) providing coupon authentication table(s) accessible by a manufacturer and accessible by a retailer; (2) providing coupon transaction ledger(s) accessible by the retailer and accessible by the manufacturer; (3) updating the coupon authentication table(s) based upon coupon authentication data provided by the manufacturer; (4) updating the coupon transaction ledger(s) based upon coupon redemption data provided by the retailer; and (5) recording information pertaining to the step of updating the coupon authentication table(s) on a blockchain data structure. In a further detailed embodiment, the method further includes a step of (6) recording information pertaining to the step of updating the coupon transaction ledger(s) on a blockchain data structure.

In a detailed embodiment of the method, a plurality of coupon authentication tables are provided for a respective plurality of retailers and a plurality of coupon transaction ledgers are provided for a respective plurality of manufacturers. Alternatively, or in addition, the method further includes a step of a smart contract triggering payment from a manufacturer to a retailer based upon information in the coupon transaction ledger(s).

In another detailed embodiment of the method, the coupon authentication table(s) and the coupon transaction ledger(s) are provided on a central server. In a further detailed embodiment, the method further includes a step of transmitting the coupon authentication table(s) from the central server to a computer system owned by a retailer. In a further detailed embodiment, the method further includes a step of a retailer authenticating coupons received at the retailer's point of sale by comparing coupon information received at the retailer's point of sale against authentication information in the coupon authentication table(s) stored on the computer system owned by the retailer.

In another detailed embodiment of the method, the step of updating the coupon authentication table(s) based upon coupon authentication data provided by the manufacturer includes a step of generating a hash value, a digital signature or an authentication key associated with the coupon authentication data. In a further detailed embodiment, the hash value, digital signature or authentication key is included with the information stored on the blockchain data structure.

In yet another detailed embodiment of the method, the step of updating the coupon transaction ledger(s) based upon coupon redemption data provided by the retailer includes a step of generating a hash value, a digital signature or an authentication key associated with the coupon redemption data. In a further detailed embodiment, the hash value, digital signature or authentication key is included with the information stored on the blockchain data structure.

In a third aspect a distributed ledger for coupon authentication is provided. In this aspect, the distributed ledger has (a) a plurality of retailer nodes, and (b) a plurality of manufacturer nodes. Each of the plurality of retailer nodes and the plurality of manufacturer nodes contain a respective copy of a coupon authentication ledger that comprises of valid coupon offers and valid digital coupons in the form of coupon authentication table. The plurality of retailer/manufacturer nodes also contain a coupon transaction ledger. The distributed ledger includes a first rule set for, upon receiving new coupon authentication check data from at least one manufacturer, updating the coupon authentication check table and transmitting the updated coupon authentication check table to at least the plurality of retailer nodes. And the distributed ledger includes a second rule set for, upon receiving coupon redemption information from at least one retailer, updating the printed coupon transaction ledger and transmitting the updated coupon transaction ledger to at least one of the plurality of manufacturer nodes.

The coupon ledger information resident on manufacturer nodes may be unique to individual manufacturers such that each manufacturer node will have only that manufacturer specific offers and data. Manufacturers can choose which retailer nodes can receive that data as part of configuring the Nodes. The coupon offer data and also other data from manufacturer is distributed to the subscribed retailer nodes that are local to retailer network. Coupons are authenticated against the authentication table on the retailer node based on a comparison of the specific manufacturer ID in the coupon and the resulting manufacturer's coupon authentication/offer data. Coupon redemption transactions are updated in the transaction ledger in the retailer node. Only the specific manufacturer transaction data is synched with the manufacturer node and updated in the shared ledger.

At least a subset of the plurality of retailer nodes may be resident on servers owned or controlled by the respective retailers, and at least a subset of the plurality of manufacturer nodes are resident on servers owned or controlled by the respective manufacturers. Alternatively, or in addition, the first or second rule set includes rules for the timing of updating the coupon authentication check table and/or the coupon transaction ledger. Alternatively, or in addition, the coupon transaction ledger includes coupon redemption information indicating coupons that have been redeemed by one or more retailers, and includes coupon payment information indicating payments made from retailers to consumers for redeemed coupons. Smart contracts may be set up based on retailer payment terms to automatically trigger payments from manufacturer to the retailers.

These and other objects and advantages of the disclosure will be apparent from the following detailed description, the appended claims and the attached drawings.

DETAILED DESCRIPTION

Figure 1:
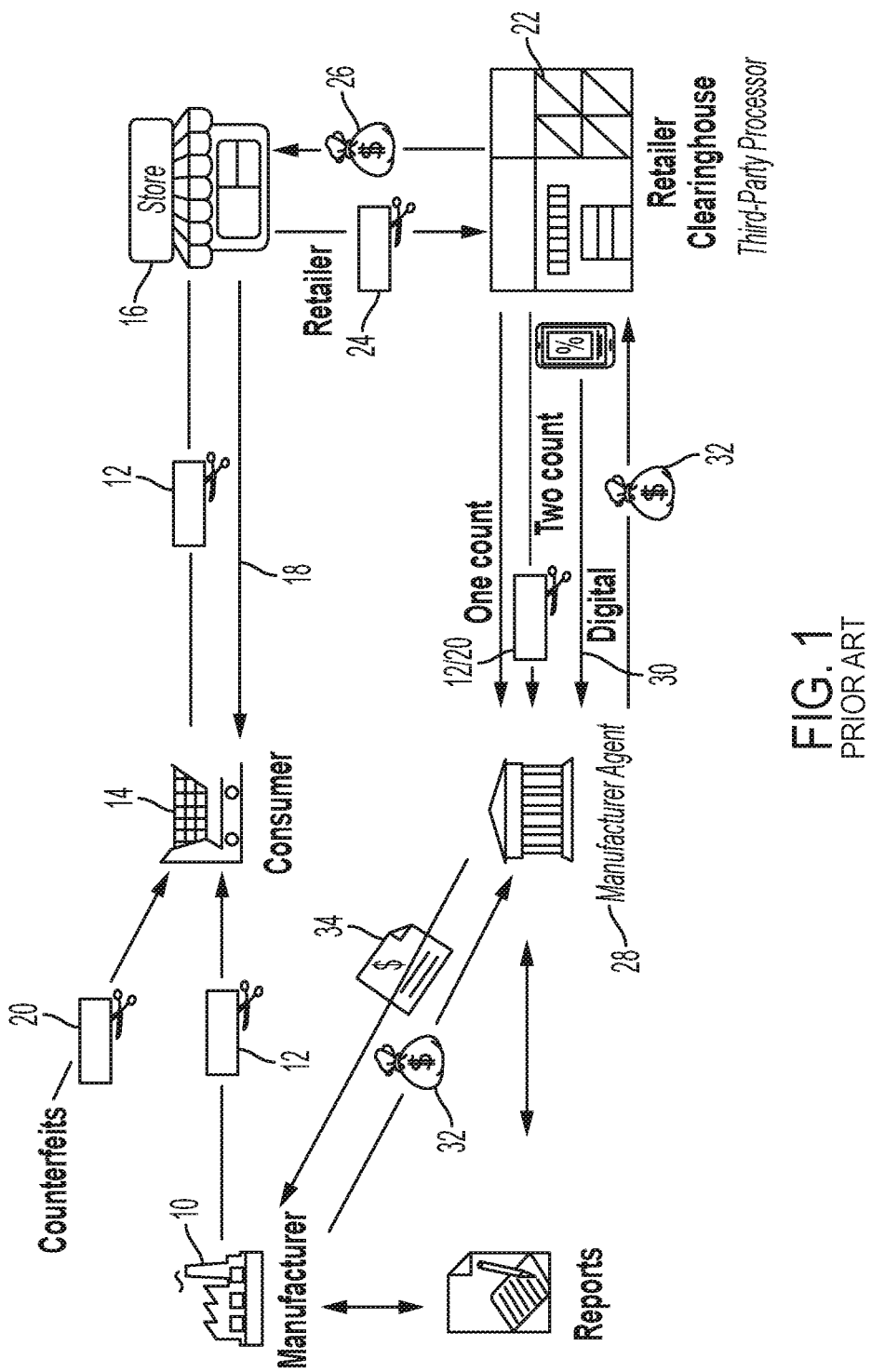
FIG. 1 is a block diagram representation of a prior art coupon authentication and redemption system.
Figure 2:
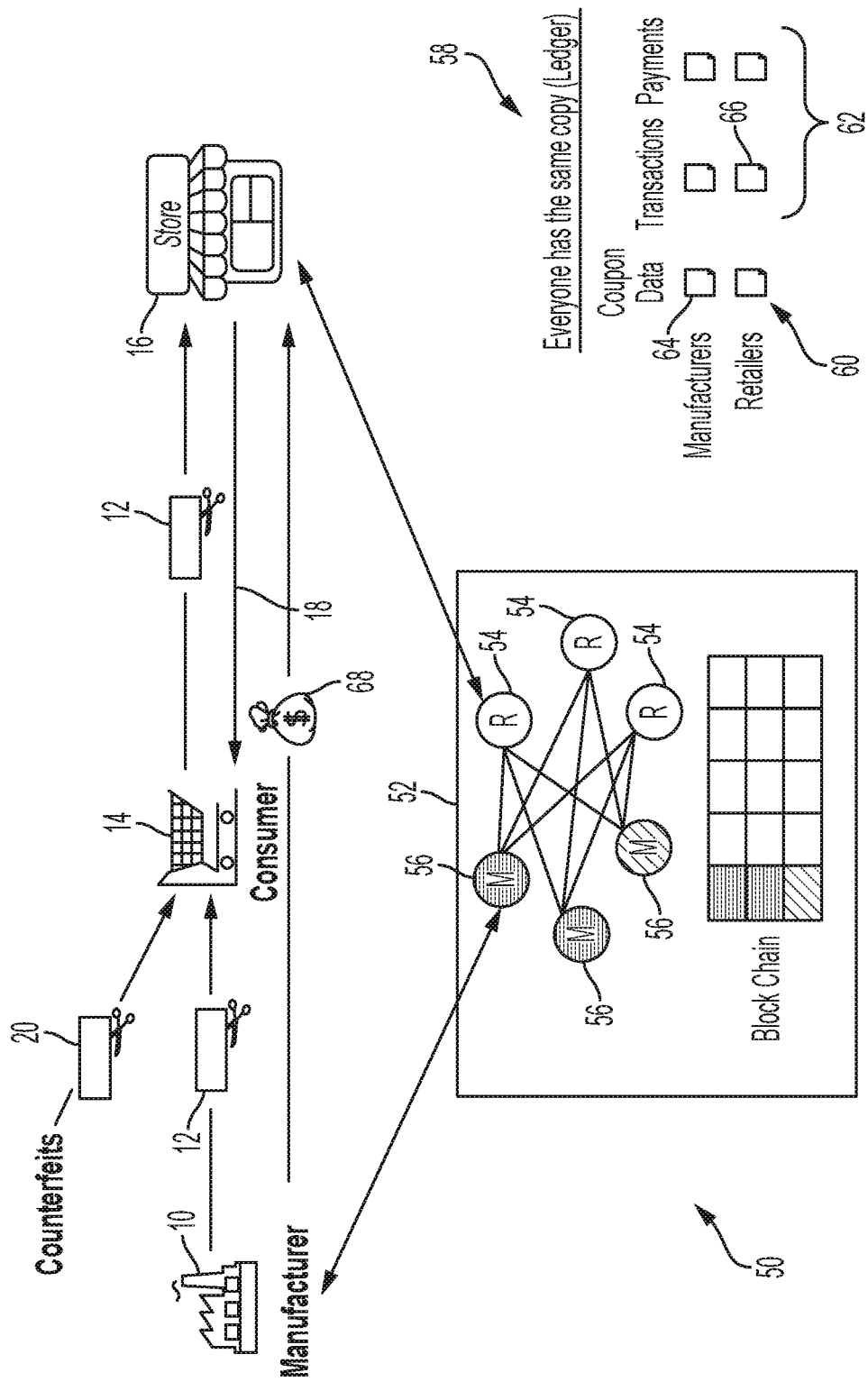
FIG. 2 is a block diagram representation of an embodiment of a coupon authentication and redemption system according to the current disclosure.

FIG. 2 shows an example embodiment of the undisputable coupon processing system 50 (and associated methods) of the present disclosure that gives full transparency to coupon redemptions enabling faster payments while eliminating fraud. The system utilizes a distributed ledger data structure 52 (which is preferably in the form of a blockchain data structure) for authenticating and clearing printed and digital/electronically created coupons. The distributed ledger 52 has a plurality of retailer nodes 54 and a plurality of manufacturer nodes 56. Each of the plurality of retailer nodes and the plurality of manufacturer nodes contain a respective copy of a coupon authentication ledger 58 that comprises valid coupon offers and valid digital coupons in the form of a coupon authentication table 60. The plurality of retailer/manufacturer nodes 54/56 also contain a coupon transaction ledger 62.

The distributed ledger 52 may be controlled by rule sets. For example, a first rule set is included for, upon receiving new printed coupon authentication check data 64 from at least one manufacturer 10, updating the coupon authentication check table and transmitting the updated coupon authentication check table to the retailer nodes 54. This updating of the retailer node coupon authentication check table 64 may be performed on a periodic basis or may be performed upon satisfaction of various rules in the first rule set. The distributed ledger 52 may also include a second rule set for, upon receiving coupon redemption information 66 from at least one retailer 16, updating the coupon transaction ledger 62 and transmitting the updated coupon transaction ledger to at least one of the plurality of the manufacturer nodes 56. Again, the timing of the updating of the transaction ledger 62 with the manufacturer nodes may be periodic or may depend upon various rules in the second rule set.

The coupon ledger information resident on the manufacturer nodes 56 may be unique to the individual manufacturers such that each manufacturer node 56 will only have that manufacturer's specific offers and data. Manufacturers 10 can choose which retailer nodes can receive that data as part of configuring the nodes and/or as part of the rule sets. Coupon offer data as well as other data from the manufacturer may be distributed to the subscribed retailer nodes 54 that are local to a retailer network. Coupons are authenticated against the authentication table 60 on the retailer node 54 based on, for example, a comparison of specific manufacturers' IDs in the coupon and the resulting manufacturers' coupon authentication/offer data. Coupon redemption transactions are updated in the transaction ledger 62 in the retailer node 54. Only the specific manufacturer transaction data is synced with the manufacturer node 56 and updated in the shared ledger.

Upon receiving by the manufacturer, the updated manufacturer transaction data on its respective transaction node 56 the manufacturer 10 will directly reimburse the retailer 16 by a direct payment 68.

At least a subset of the plurality of retailer nodes 54 may be resident on servers owned or controlled by the respective retailers 16, and at least a subset of the plurality of manufacturer nodes 56 may be resident on servers owned or controlled by the respective manufacturers 10.

The first or second rule set may include rules for the timing of updating the coupon authentication check table 60 and/or the coupon transaction ledger 62.

The coupon transaction ledger 62 may include coupon redemption information indicating coupons that have been redeemed by one or more retailers, and may include coupon payment information indicating payments made from retailers to consumers for redeemed coupons. Smart contracts may be setup based on retailer payment terms to automatically trigger payments 68 from manufacturer 10 to the retailers 16.

New coupon offers can be sent automatically from the manufacturer 10 to the coupon redemption, authentication and payment network 50. The network quickly and automatically reviews the coupon transactions and facilitates the payments 68 that are made directly by the manufacturer 10 to the retailer 16. The retailers 16 utilizing the coupon redemption, authentication and payment system 50 are able to validate the coupons in real time because the updated authentication check tables 64 are resident on nodes 54 owned or controlled by the retailers. Consequently, the cashier having real time access to the updated coupon authentication table 64 is able to provide discounts only for validated coupons at the point of sale. Additionally, the redemptions of these coupons can be also placed on the ledger 62 substantially in real time.

The benefits of such a system to manufacturers are numerous. For example, the current system 50 can eliminates counterfeit coupon redemptions; reduces the need for third party clearing houses to manage the back office reconciliation of coupons and payments; distributes offer and family code detail seamlessly; and provides a trusted system that is transparent to retailers and manufacturers, thereby simplifying any necessary audits.

In addition, the system benefits retailers. For example, retailers are able to receive coupon payments many times faster than in the prior art. Manufacturers can set up payment conditions (mutually agreed with retailers) that will trigger payments as soon as conditions are met. The system 50 reduces or eliminates the need to audit physical coupons; reduces the overhead of handling physical coupons; and allows technology partners to scale the solution to other manufacturers.

Figure 3:
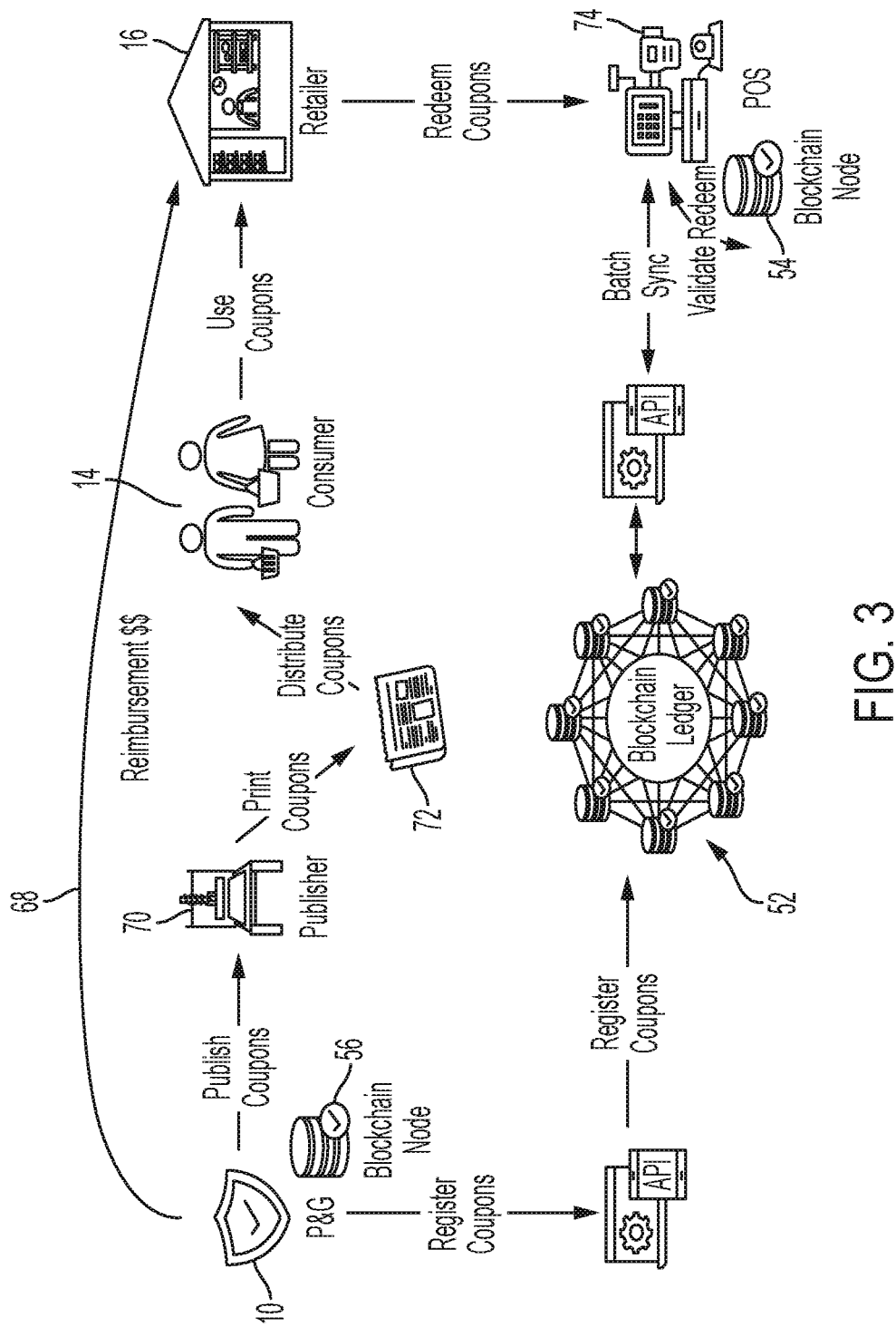
FIG. 3 is a flow diagram representation of the embodiment of FIG. 2.

FIG. 3 provides a block diagram representation of a method for practicing aspects of the current disclosure. As shown in FIG. 3, manufacturer 10 having a manufacturer block chain node 56 will authorize a publisher 70 to print coupons 72 that will be redeemed by the consumers 14 at a retailer 16. The retailer 16, also having a retailer block chain node 54 resident on its data systems 74, will consult the coupon authentication check table resident on the block chain node 54 in real time to determine whether the coupons offered for redemption by the consumer 14 are authentic and authorized. Thereafter, only the authentic and authorized coupons as authorized by the coupon authentication check data will be redeemed and the transaction information for that redemption will be recorded on the coupon transaction ledger that is also resident on the retailer's block chain node 54. Based upon a preset timetable or upon triggering by a rule set, the distributed ledger 52 will update the transaction ledger on the manufacturer's block chain node 56 with the transaction ledger data received from the retailer's block chain node. Upon receiving this updated transaction ledger information on its block chain node 56, the retailer can commence payment 68 back to the retailer to reimburse for the discounts provided to the consumers through the use of the authenticated and validated coupons. Additionally, when new coupons are sent to publication, the manufacturer can register these new coupons in the manufacturer's version of the coupon authentication table resident on its block chain node 56. Thereafter, either based upon a periodic schedule or based upon being triggered by certain rule sets, the distributed ledger 52 will update the coupon authentication tables based upon this new information provided by the manufacturer 10 on the block chain nodes 54 of the relevant retailers.

The distributed ledger(s) (or shared ledger(s)) 52 is spread across several nodes 54/56 of the data structure, where each node replicates 54/56 and saves identical copies of the ledger(s) 58 (or necessary portions of the ledger specific to the retailer/manufacturer). The retailer nodes 54 are preferably resident on or controlled by retailer (coupon acceptor) systems/servers 74, while manufacturer nodes 56 are preferably resident on manufacturer (coupon issuer) systems/servers. The rule sets may reside on a reconciler node on the data structure 52. The reconciler node may be responsible, on a periodic basis, for reconciling changes made to the ledgers 58 on each of the individual nodes 54/56, and then updating the identical copies on the retailer/manufacturer nodes 54/56.

Utilization of blockchain (versus centralized storage, for example) can help protect the system 50 against system failure, fraud, and other security risks. These decentralized and distributed systems can store and relay large volumes of information, without the potential downfalls of large, centralized servers. With the blockchain's smart contracts and immutable ledger powering authentication, redemption and payment of the coupons, embodiments of the current disclosure can minimize friction and costs typically associated with the prior art systems. With blockchain, the coupon redemptions and associated transactions are permanently recorded.

Figure 4:
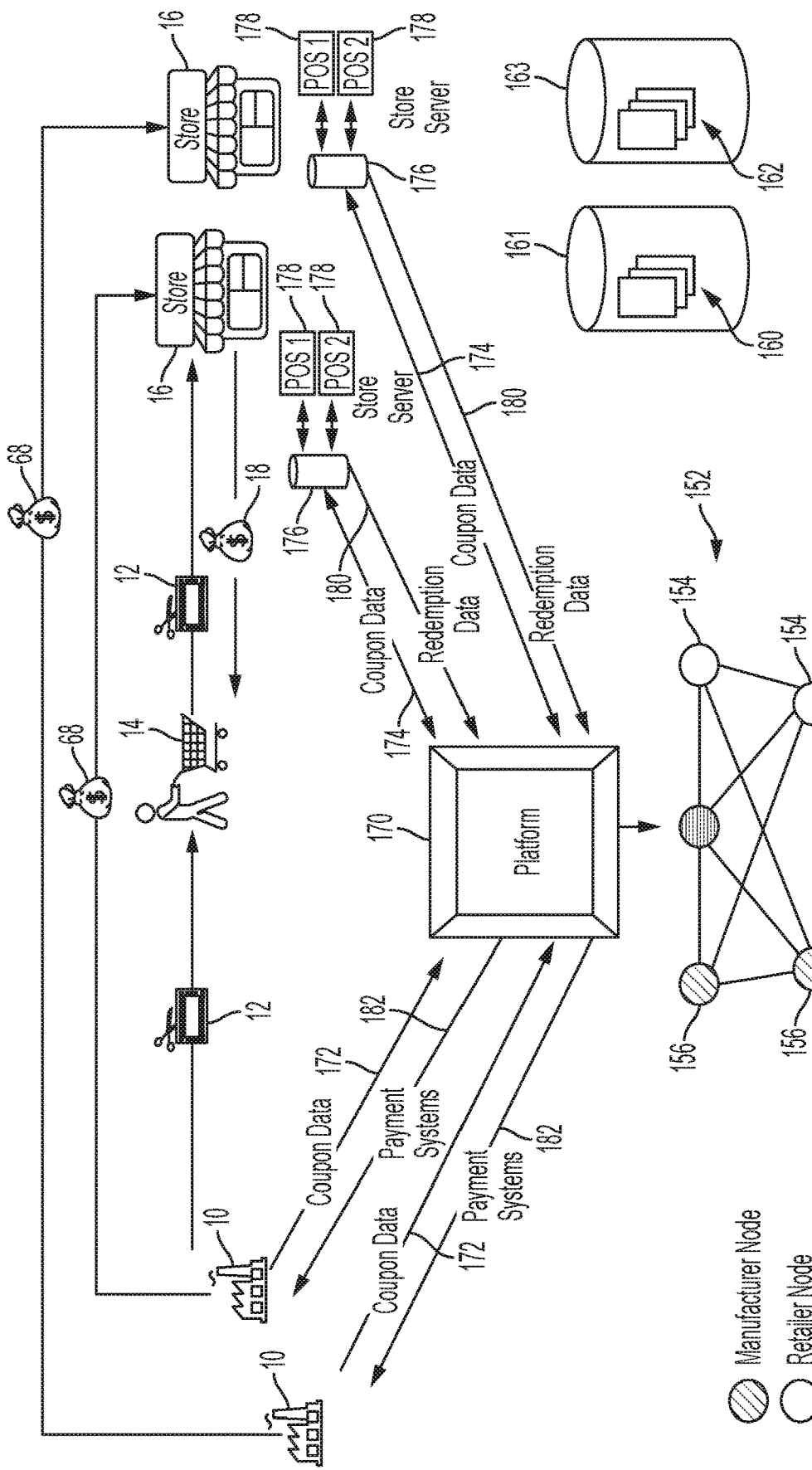
FIG. 4 is a block diagram representation of another embodiment of a coupon authentication and redemption system according to the current disclosure.

FIG. 4 provides another exemplary embodiment of the current disclosure. In this embodiment, a central platform 170 may reside over the blockchain distributed ledger data structure 152. The central platform 170 may contain the coupon authentication table(s) 160 in database 161 maintained and updated by the manufacturers 10 respectively for each of the retailers 16. The central platform 170 also contains the coupon transaction ledger(s) 162 in database 163. The embodiment of FIG. 4 may use the blockchain distributed ledger 152 as an immutable ledger for authenticating and tracking any and all access and revisions to the coupon authentication table(s) 160 and coupon transaction ledger(s) 162. The records are immutable and can be used by the manufacturers 10 and/or retailers 16 to audit for any tampering of data.

The central platform 170 may be any appropriate form of a computerized platform. For example, the central platform 170 comprise a single computer or server, a series of computers or servers and/or may be cloud-based. Additionally, the central platform 170 may include dedicated databases or may utilize external or could-based databases. The "central" designation is not intended to have a geographic or locational connotation, only that it is accessible by both the manufacturers 10 and the retailers 16 either directly or indirectly. Similarly, the coupon authentication table(s) described herein do not necessarily need to be in the form of any specific table structure. The word "table" is utilized in a sense to indicate that information is provided and structured in a way to allow retailers, for example, to identify whether coupons offered at the point-of-sale are authorized. Similarly, the coupon transaction ledger(s) described herein do not necessarily need to be in the form of any specific ledger structure. The word "ledger" is used in a sense to indicate that information is provided and structured in a way to allow manufacturers, for example, to identify the authorized coupons that have been redeemed so that, for example, appropriate payments 68 back to the retailers may be accurately calculated. Similarly, the database(s) described herein do not require any specific database structure or arrangement, only that data may be stored, organized and accessed according to the functional descriptions provided herein.

As part of this embodiment, the manufacturers 10 may leverage hashing algorithms to generate hashes of coupon authentication information (positive offer coupon data) 172 and may update the central platform 170 with the hash or digital signature and the positive offer coupon data 172 using APIs. Manufacturers 10 will assign ownership of the coupon authentication data to the retailer(s) 16. The central platform 170 may update the coupon authentication table(s) 160 and will then add a block in the distributed ledger 152 with the hash, digital signatures, ownership and time stamp information. The manufacturer 10 may be able to assign an owner (a specific retailer 16) for the data block in the database 161 and only that data is available for designated retailer(s) 16 to extract. The database 161 may host the coupon authentication table(s) and the associated hash and digital signatures.

Only the assigned owners (Retailer(s) 16) may pull the coupon authentication data 174 from the central platform 170, and the coupon authentication data 174 will then be distributed to the retailer's local systems 176 and used to authenticate coupons at the point of sale terminals 178. The logs of coupon transactions (valid coupons, mis-redemptions, counterfeits rejections) may be captured in a redemption data file in the retailer's local systems 176. The data may be hashed at the at the retailer system 176 using hashing algorithm and signed by the retailer systems 176. The retailer 16 may update the redemption data 180 along with hash and digital signatures in the central platform 170 using APIs. The redemption data 180 may also include ownership data so only the manufacturer who is tagged as the owner will have access to that data in database 163. When the appropriate coupon transaction ledger(s) 162 are updated in database 163, the central platform may add a block to the blockchain with hash, digital signature and associated time stamp(s).

Smart contracts in the central platform 170 can trigger payments 68 to retailers by leveraging the integration provided by the manufacturers 10 into their payment systems 182. Central platform 170 may reconcile the transactions from redemption data 180 and will enable manufacturers 10 to initiate payments 68 via payment instructions 182 from the central platform 170. Reconciliation may be done by the central server 170 based on smart contracts for the redemption data ownership. Smart contracts in the central platform 170 can also assign ownership of data records (e.g., ownership of certain coupon authentication information to certain retailers 16 and/or ownership of certain coupon redemption information to certain manufacturers 10) so that only the owners of such information have access to the data.

The embodiment of FIG. 4 may manage the security to ensure that only owner of the respective data can view the data and also assign subscribers who can access the data. Retailers will be able to read their owned coupon authentication table 160 data from the central platform 170 using published APIs and will then store the coupon authentication information locally to their systems 176. This allows the retailer systems 176 to validate coupons received at point-of-sale terminals 177 locally. The embodiment of FIG. 4 also provides APIs for the retailer systems 176 to write back the transactions data (redemption data 180) to the central platform 10 and blockchain ledger 152 using valid authentication keys. The entries to the blockchain ledger 152 cannot be modified without the consensus of all participants. Also, storage of access/revisions to the coupon authentication table(s) 160 and coupon transaction ledger(s) 162 in the blockchain ledger 152 allows for the ability of the manufacturer(s) 10 and/or retailer(s) 16 audit the blockchain ledger 152 at any time using their appropriate hash keys to validate the authenticity of the revisions and transactions.

Having described the inventions in reference to exemplary embodiments, it will be apparent that modifications can be made without departing from the scope of the invention as reflected in the following claims. Furthermore, while the current disclosure described various objects and advantages of the various inventions described herein, it is not necessary to meet all or any of such objects and advantages since other objects and advantages may be present even though they may not have been expressly discussed herein. Likewise, it will be understood the diagrams of FIGS. 2, 3 and 4 are primarily functional diagrams and the embodiments disclosed herein can be implemented by various physical structures and arrangements as known in the art. Likewise, it will be understood that "manufacturers" as described herein need not necessarily manufacture products—they only need to be responsible for issuing coupons on commercial products; and it will be understood that "retailers" are the entities at which customers/users will attempt to redeem such coupons.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A central-server-implemented method for authenticating coupons at a retailer point-of-sale, the method comprising the central server:

providing a shared coupon authentication table accessible by a manufacturer and accessible by a retailer;

providing one or more coupon transaction ledgers accessible by the retailer and accessible by the manufacturer, each coupon transaction ledger comprising coupon redemption data;

enabling updating, by the manufacturer, of the shared coupon authentication table based upon coupon authentication data provided by the manufacturer by generating an authentication hash value, an ownership, and a digital signature associated with the coupon authentication data;

enabling authenticating, by the retailer, of a coupon presented by a customer at the point-of-sale using coupon authentication data from the shared coupon authentication table before enabling the coupon to be used;

enabling updating, by the retailer, of the one or more coupon transaction ledgers based upon coupon redemption data provided by the retailer by applying a hashing algorithm to the coupon redemption data to generate a redemption hash value;

recording (i) information pertaining to the updating of the shared coupon authentication tables and (ii) the redemption hash value on a blockchain data structure without recording the corresponding coupon redemption data on the blockchain data structure, wherein the shared coupon authentication table and the one or more coupon transaction ledgers are provided by the central server that resides over the blockchain data structure; and transmitting, based on a smart contract allowing access to the shared coupon authentication table, information identifying authentic coupons of the shared coupon authentication table from the central server to a computer system of the retailer, wherein the computer system of the retailer is configured to authenticate coupons received at the retailer point-of-sale by comparing coupon information received from the customer at the retailer point-of-sale against the information identifying the authentic coupons; and enabling a smart contract allowing access to the one or more transaction ledgers to trigger payment from the manufacturer to the retailer for coupon redemptions based upon information in the one or more coupon transaction ledgers.

2. The method of claim 1, wherein a plurality of coupon authentication tables are provided for a respective plurality of retailers.

3. The method of claim 1, wherein a plurality of coupon transaction ledgers are provided for a respective plurality of manufacturers.

4. The method of claim 1, wherein the authentication hash value, the ownership, and the digital signature associated with the coupon authentication data are included with the information stored on the blockchain data structure.

5. The method of claim 1, wherein the step of updating the one or more coupon transaction ledgers based upon the coupon redemption data provided by the retailer includes a step of generating the redemption hash value, an ownership, and a digital signature associated with the coupon redemption data.

6. The method of claim 5, wherein the redemption hash value, the ownership, and the digital signature associated with the coupon redemption data are included with the information stored on the blockchain data structure.

7. The method of claim 1, wherein the coupon authentication data pertains to printed coupons, and the coupon presented by the customer at the retailer point-of-sale is a printed coupon.

8. The method of claim 1, wherein:
the authentication hash value is generated by applying a hashing algorithm to coupon authentication information; and
the authentication hash value is stored on the blockchain data structure without storing the corresponding coupon authentication information on the blockchain data structure.

9. A distributed ledger data system for authenticating and clearing coupons at a retailer point-of-sale, comprising:
a distributed ledger data structure having a plurality of retailer nodes and a plurality of manufacturer nodes, each of the plurality of retailer nodes and each of the plurality of manufacturer nodes containing a respective copy of (i) a coupon authentication ledger, the coupon authentication ledger including valid coupon offers in a form of a shared coupon authentication check table, and (ii) a coupon transaction ledger;

a reconciler node including a first rule set for, upon receiving new coupon authentication check data from at least one manufacturer, updating the corresponding shared coupon authentication check table and transmitting, based on a smart contract allowing access to the updated shared coupon authentication check table, information identifying authentic coupons to at least the plurality of retailer nodes, wherein the information identifying the authentic coupons is used to authenticate coupons received at the retailer point-of-sale before allowing a coupon to be redeemed; and the reconciler node including a second rule set for, upon receiving coupon redemption information from at least one retailer, updating the coupon transaction ledger, wherein coupon offer data from the manufacturer is distributed, based on a smart contract allowing access to one or more subscribed retailer nodes that are local to a retailer network, wherein the distributed ledger data structure stores a redemption hash value corresponding to coupon redemption data without storing the coupon redemption data on the distributed ledger data structure.

10. The distributed ledger data system of claim 9, wherein the coupons are printed coupons.

11. The distributed ledger data system of claim 9, wherein the coupons are printed coupons and digital coupons.

12. The distributed ledger data system of claim 9, wherein each coupon transaction ledger is specific to a specific manufacturer.

13. The distributed ledger data system of claim 9, wherein the shared coupon authentication check table is used to authenticate redeemed coupons on a retailer node based upon a specific manufacturer ID in the coupon compared with manufacturer's coupon authentication and/or offer data present in the shared coupon authentication check table.

14. The distributed ledger data system of claim 9, wherein all coupon transactions by a retailer are updated in the coupon transaction ledger on a respective retailer node.

15. The distributed ledger data system of claim 9, wherein the updated coupon transaction ledger for each manufacturer includes only transaction information pertaining to that specific manufacturer.

16. The distributed ledger data system of claim 9, wherein the distributed ledger data structure is a block chain data structure.

17. The distributed ledger data system of claim 9, wherein at least a subset of the plurality of retailer nodes are resident on servers owned or controlled by the respective retailers, and at least a subset of the plurality of manufacturer nodes are resident on servers owned or controlled by the respective manufacturers.

18. The distributed ledger data system of claim 9, wherein the first or second rule set includes rules for the timing of updating the shared coupon authentication check table and/or the coupon transaction ledger.

19. The distributed ledger data system of claim 9, wherein the coupon transaction ledger includes coupon redemption information indicating coupons that have been redeemed by one or more retailers and includes coupon payment information indicating payments made to retailers from manufacturers for redeemed coupons.

20. The distributed ledger data system of claim 9, wherein the distributed ledger data structure further comprises smart contracts set up based on retailer payment terms to automatically trigger payments from manufacturers to retailers based upon authenticated and redeemed coupons using the distributed ledger data structure.

21. The distributed ledger data system of claim 9, wherein the distributed ledger data structure stores an authentication hash value generated by applying a hashing algorithm to coupon authentication information without storing the corresponding coupon redemption data on the distributed ledger data structure.

22. A system for authenticating and clearing coupons at a retailer point-of-sale (POS) comprising:
  a. a central platform operatively connected to a database storing:
    i. a coupon authentication table assigned to a particular retailer by a given manufacturer that updates the coupon authentication table, wherein the coupon authentication table includes coupon authentication information provided by the given manufacturer as an authentication hash and a digital signature and identifies the particular retailer to which the coupon authentication information is assigned; and
    ii. a coupon transaction ledger assigned to the given manufacturer by the particular retailer that updates the coupon transaction ledger, wherein the coupon transaction ledger enables the given manufacturer to determine if authorized coupons have been redeemed; and
  b. a blockchain distributed ledger over which the central platform resides, the blockchain distributed ledger comprised of manufacturer nodes and retailer nodes, wherein the central platform adds a block to the blockchain distributed ledger in response to receiving an update to the coupon authentication table, an update to the coupon transaction ledger, or both, wherein a block corresponding to an update to the coupon transaction ledger comprises a redemption hash value corresponding to coupon redemption data without storing the coupon redemption data on the blockchain distributed ledger, wherein:
    the central platform is configured to communicate with a manufacturer computer system and a retailer computer system;
    the manufacturer computer system is operated by the given manufacturer, the manufacturer computer system providing a coupon for use by a customer and coupon authentication information corresponding to the coupon, a retailer assigned to the coupon authentication information, and a hashing algorithm to generate an authentication hash of the coupon authentication information before the coupon authentication information is transmitted to the central platform for updating the coupon authentication table; and
    the retailer computer system is operated by the particular retailer, the retailer computer system including the POS, a local storage, and a log of coupon transactions captured in a local redemption data file, wherein the retailer computer system accesses a current copy of the coupon authentication table from the central platform to determine if the coupon presented at the POS is authentic, and updates the log of coupon transactions to indicate whether the presented coupon is valid, misrepresented, or a counterfeit, and wherein the retailer computer system uses a hash algorithm to hash updates captured in the local redemption data file, which updates are transmitted to the central system to update the coupon transaction ledger, wherein the hash algorithm generates the redemption hash value corresponding to the coupon redemption data.

23. The system of claim 22, wherein the central platform stores a plurality of coupon transaction ledgers, each coupon transaction ledger being owned by a respective manufacturer.

24. The system of claim 22, wherein the central platform stores a plurality of coupon authentication tables, each coupon authentication table being owned by a respective retailer.

25. The system of claim 22 further comprising a smart contract, the smart contract triggering coupon redemption payments from the given manufacturer to the particular retailer based upon the valid coupons redeemed by the particular retailer reflected in the updated coupon transaction ledger.

26. The system of claim 22 further comprising a smart contract indicating that the particular retailer has been assigned ownership to particular coupon authentication data provided in the coupon authentication table such that only the particular retailer can pull its owned coupon authentication table data from the coupon authentication table.

27. The system of claim 22 wherein the retailer computer system determines if the coupon presented at the POS is authentic before allowing the coupon to be redeemed.

28. The system of claim 22 wherein the coupon presented at the POS is a printed coupon.

29. The system of claim 22, wherein an authentication hash value generated by applying a hashing algorithm to coupon authentication information is stored on the blockchain distributed ledger without storing the corresponding coupon authentication information on the blockchain distributed ledger.

* * * * *